(12) United States Patent
Koebler et al.

(10) Patent No.: US 9,069,175 B2
(45) Date of Patent: Jun. 30, 2015

(54) ADAPTIVE PHASE CONTRAST MICROSCOPE

(75) Inventors: Douglas J. Koebler, Irwin, PA (US); Alfred Blalock Bahnson, Pittsburgh, PA (US)

(73) Assignee: Kairos Instruments, LLC, Pittsburgh, PA (US)

( * ) Notice: Subject to any disclaimer, the term of this patent is extended or adjusted under 35 U.S.C. 154(b) by 595 days.

(21) Appl. No.: 13/442,251

(22) Filed: Apr. 9, 2012

(65) Prior Publication Data

US 2012/0257040 A1    Oct. 11, 2012

Related U.S. Application Data (60) Provisional application No. 61/473,252, filed on Apr. 8, 2011.

(51) Int. Cl.
    *G02B 21/14* (2006.01)
(52) U.S. Cl.
    CPC ..................................... *G02B 21/14* (2013.01)
(58) Field of Classification Search
    CPC .......................................................... G02B 21/14
    USPC ................... 359/387; 348/80, E7.085; 349/1
    See application file for complete search history.

(56) References Cited

U.S. PATENT DOCUMENTS

| | | | |
|---|---|---|---|
| 3,920,311 A | 11/1975 | Tsuda et al. | |
| 4,561,731 A | 12/1985 | Kley | |
| 5,420,717 A | 5/1995 | Tabata | |
| 5,751,475 A * | 5/1998 | Ishiwata et al. | 359/387 |
| 5,969,853 A | 10/1999 | Takaoka | |
| 5,969,855 A * | 10/1999 | Ishiwata et al. | 359/386 |
| 6,078,681 A * | 6/2000 | Silver | 382/133 |
| 6,243,197 B1 | 6/2001 | Schalz | |
| 6,317,261 B1 * | 11/2001 | Otaki | 359/387 |
| 6,804,050 B2 * | 10/2004 | Parks | 359/388 |
| 6,885,492 B2 | 4/2005 | DeSimone et al. | |
| 6,924,893 B2 * | 8/2005 | Oldenbourg et al. | 356/369 |
| 6,972,892 B2 | 12/2005 | DeSimone et al. | |
| 7,034,983 B2 | 4/2006 | DeSimone et al. | |
| 7,212,338 B2 | 5/2007 | Weyh et al | |
| 7,532,323 B2 | 5/2009 | Tang et al. | |
| 7,755,832 B2 | 7/2010 | MacAulay | |
| 2004/0120029 A1 * | 6/2004 | Krueger | 359/370 |
| 2005/0219988 A1 | 10/2005 | Atarashi et al. | |
| 2010/0194855 A1 | 8/2010 | Mamiya | |

FOREIGN PATENT DOCUMENTS

JP    27-2523    7/1952

* cited by examiner

*Primary Examiner* — Frank Font
(74) *Attorney, Agent, or Firm* — The Webb Law Firm (57) ABSTRACT

An optical microscope is provided with an adjustable optical phase ring. The adjustable ring provides a way to compensate for distortion in the visible phase ring before the light reaches the sample. In an inverted microscope, when observing transparent cells under a liquid, the visible light phase ring is distorted. By the use of a Liquid Crystal Display (LCD) in place of a fixed ring, the projected ring is adjusted to realign the light and produce phase. In a typical micro plate, the meniscus formed produces a lens effect that is realigned by providing changes in the position and pattern, to allow phase imaging over a wider portion of the well. The realignment of the ring can be manual or automated and can be dynamically adjusted based upon an observed image of the sample.

20 Claims, 6 Drawing Sheets

ADAPTIVE PHASE CONTRAST MICROSCOPE

CROSS-REFERENCE TO RELATED APPLICATION

This application claims priority to U.S. Provisional Patent Application No. 61/473,252 filed Apr. 8, 2011, which is incorporated herein by reference.

BACKGROUND OF THE INVENTION

1. Field of the Invention

The present invention is directed to an optical microscope having an adjustable optical condenser annulus and, more particularly, to a phase contrast or inverted microscope using an electrical device to construct a dynamically adjustable visible condenser annulus for viewing transparent living cells under a liquid.

2. Description of Related Art

The present invention relates to a phase contrast microscope for viewing transparent living cells under a liquid. In this configuration of the microscope, called an inverted microscope, the samples of cells are placed in a micro plate under a liquid. Living cells are placed on a plate on the microscope and a light from above the well illuminates the sample. The cells are typically at the bottom of the well. The micro plate well has a clear bottom and the objective, located below the well, is focused on the cells. The focused light then travels down into the microscope to the eyepiece or off to a camera for viewing the cells for discovery.

Live cells are transparent and difficult to see without a means to enhance the image. A method called Phase Contrast Imaging is common technique for improving the contrast of the cell. The visible light used to illuminate the cells is first passed through a condenser annulus, which is a piece of metal with a stamped circular ring, where light can pass to produce the bright or visible phase ring. This ring is specific to the objective used for magnifying the cell for observation. After the visible condenser annulus, the bright phase ring travels through a condenser lens to collimate the light and then on to the sample plane. If there is no sample in the plane, the light travels on through the objective where the light is magnified. In a phase contrast objective, below the magnification lens, is a black ring. If there is no distortion to the light, this dark phase ring blocks the light from the bright condenser annulus.

Alignment of the bright or light phase ring from the condenser annulus, with the dark phase ring is necessary for getting good phase when viewing transparent cells under the microscope. The alignment method involves switching to a Bertrand lens in the eyepiece. The researcher switches a lens and ring into the eyepiece and manually adjusts, usually via adjustment knobs, a joystick, a computer, and the like to adjust the visible condenser annulus to align the visible ring with the black ring. With the sample in the light path, the transparent cell causes the light ring to be refracted, resulting in misalignment with the dark phase ring. This misalignment causes constructive interference, producing a bright area. There is typically greater refraction at the edges of cells, producing a bright edge and improving the contrast in the image. Cells that are typically very difficult to see under the microscope can be observed and imaged to a much finer detail by using the Phase Contrast Imaging method.

In the case where one is observing live cells under a liquid, the light is distorted by the liquid before reaching the cell and phase imaging is greatly compromised. Since the meniscus of the liquid is typically well defined, the meniscus acts like a lens aligned with the objective only in the middle of the sample well. In the middle of the well, a reduced but useable version of phase imaging is possible, however, care must be taken to ensure that the image is taken from the middle of the well, otherwise, the image is not useable.

Micro plates come in many different configurations having 6, 12, 24, 48, 96, 384, and 1536 wells. In a 6-well plate, a single well is 1.4" (3.56 cm) in diameter. The meniscus is more pronounced at the edge and the liquid flattens out toward the center of the well. Phase imaging of a live cell under the liquid at the center of a 6-well plate is good and is used by many researchers for their live cell studies. However, during the course of observation of the live cells, the distribution of the cells may change causing one to move away from the center of the well. Accordingly, the phase will start to change or reduce. The further away one is, the less detail that can be seen in the cells. Also, if one were using a micro plate having smaller wells, such as a 96-well plate, for example, the well diameter is 0.26" (0.66 cm). In this case, the meniscus lens effect is pronounced. Thus, one can only get minimal phase at the very center of the well. For micro plates with higher number wells, which are significantly smaller, such as micro plates a number wells of 384 and 1536, there is no phase. Hence, use of these micro plates having a higher number of wells would be difficult, if not impossible.

In some cases, it is possible to manually adjust the phase ring while observing cells in a well, even off-center, and get some phase to help with viewing the cells. This method is obviously very helpful, but this changes with location and changes from well to well during a series of observations. The fluid height and viscosity of the liquid in the well also change during the course of an observation, which can take several days or span a series of wells in a micro plate, and can change the effect when viewing with phase. A dynamic means is required to compensate for these changes in the light path when viewing live cells under a liquid over the course of the observation or over a series of observations.

U.S. Pat. No. 5,751,475 to Ishiwata, which is incorporated by reference in its entirety, discloses a phase contrast microscope that uses an Liquid Crystal Display (LCD) in place of the dark phase ring. The goal of Ishiwata is to provide both phase imaging and standard visible light imaging without changing the phase ring. The reference discusses two modes of operation of the microscope, with phase imaging and without phase imaging for specimen inspection. The background portion of Ishiwata refers to Japanese Patent Application No. 27-2523 as being directed to a proposed method of adjusting a contrast of a phase contrast image by changing a phase difference and transmissivity at a phase ring by using a polarizing plate which is rotated. However, the rotation of this polarizing plate requires a separate mechanical member.

U.S. Pat. No. 5,969,853 to Takaoka, which is incorporated by reference in its entirety, discloses an optical microscope having optical modulation elements to produce various changes to the dark ring for contrast enhancement by providing regions for high and low transmittance.

There is a need in the art for an improved phase contrast imaging system for use in inverted microscopes over a wide portion of a micro plate when viewing through a liquid. There is also a need in the art for a system which allows for turning the visible light for imaging on and off; a system or device for providing a variety of wavelengths for visible imaging; and a system for dynamically adjusting the visible condenser annulus based upon the well size and number of wells of the particular micro plate being used and also based upon the position, fluid height and/or viscosity of the sample.

SUMMARY OF THE INVENTION

According to a first aspect, the present invention replaces the visible condenser annulus typically used in phase contrast imaging, with an LCD and visible light is passed through the LCD with the pattern of the former metal condenser annulus. The pattern on the LCD is provided by an electrical component which can be attached to a computer for pattern manipulation.

According to a second aspect, the present invention provides a switch for the LCD to turn on/off the visible light in automated imaging systems. This visible light can then be adjusted for intensity and wavelength, based on the color transmitted through the LCD.

According to a third aspect, the present invention includes a second camera mounted on the eyepiece, with the Bertrand lens in place. This image is used to adjust the light pattern from the visible LCD, to align the light and dark rings and to compensate for a meniscus that is off-center from the viewing area in a micro plate well. The pattern in the visible LCD is shifted and the pattern changed to an oval, for example, allowing for a greater region of viewing in the micro plate.

According to a fourth aspect, implementation of the invention involves adjusting the phase ring by using image processing techniques, looking for peak intensity in the image based on a pixel contribution to the phase contrast image. This is accomplished by sending a sequence of patterns through the sample and processing the images to develop the best pattern for a final phase image. The method will work with or without the use of the Bertrand image. Since this is a dynamic adjustment of the phase ring, changes in objectives or changes in the plate or the fluid height, as well as changes in the fluid viscosity can all be corrected. As the cells in the well change shape and density, changes in the visible condenser annulus are adjusted and the intensity of the light adjusted, typically brighter, to provide an improved image over a longer period of time.

According to a fifth aspect, the invention allows for the wavelength used to image the cells and view cells to be adjustable. Many cameras are sensitive to certain wavelengths, as well as the human eye. The transmitted light through the LCD can be adjusted to transmit a specific band of light, taking into account the improved imaging capabilities of the camera. The wavelength of the light also has an effect on the cells. Live cells are more sensitive to shorter wavelengths, and in some cases, the lens in the microscope can be affected by the wavelength as well. Small changes in focus, due to changes in the wavelength are possible with this system.

According to a final aspect of the invention, in most automated systems, both visible phase imaging and fluorescent imaging are automated. The visible light and the fluorescent light are both controlled by mechanical shutters that turn on/off the visible and fluorescent lights independently. This LCD can be used to turn off the visible light, by making the visible condenser annulus black to turn off the light. A separate LCD in the fluorescent path can turn on/off the fluorescent light.

The use of a compensating, adjustable phase ring allows for a much larger area of the micro plate to be used in a given experiment, improving the output from the experiment and extending the time of the experiment for further discovery.

These and other features and characteristics of the present invention, as well as the methods of operation and functions of the related elements of structures, and the combination of parts and economies of manufacture, will become more apparent upon consideration of the following description with reference to the accompanying drawings, all of which form a part of this specification, wherein like reference numerals designate corresponding parts in the various figures.

DETAILED DESCRIPTION OF THE INVENTION

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 1:
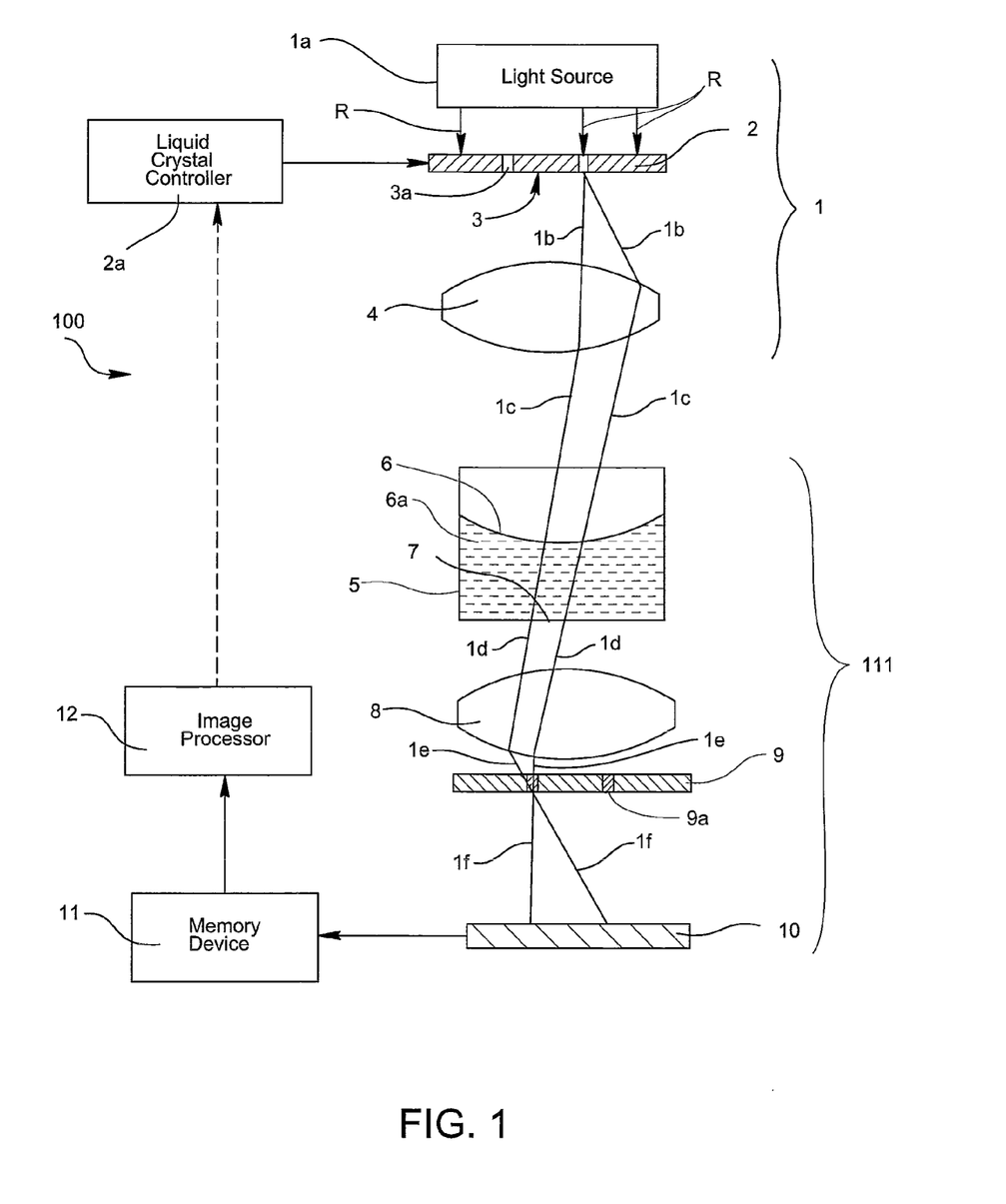
FIG. 1 is a schematic side view showing an embodiment of the phase contrast microscope according to the invention.

Reference is now made to FIG. 1 which is a schematic side view showing an embodiment of the phase contrast microscope, generally indicated as 100, according to one arrangement of the invention. The inverted microscope includes an illuminating optical system 1 and an imaging optical system 111. The illuminating optical system 1 includes a visible light source 1a, which can include, but is not limited to a light bulb, LED, or any type of collimated light source known in the art. The visible light source 1a emits visible light rays R to form an LCD 2. The LCD 2 cooperates with a computer and/or a liquid crystal controller 2a to produce a pattern, as generally indicated as 3, on the screen of the LCD 2. This LCD 2 is used in place of the a bright phase ring produced from the condenser annulus, that has been typically used in a phase contrast microscope of the prior art as discussed in detail above. This pattern 3 has a clear center ring 3a. By its very nature, an LCD 2 can emit various colors and/or patterns as desired. An example of one type of LCD that can be used in the invention is manufactured by EarthLCD, however, any type of known LCD can be used with the phase contrast microscope 100. The pattern 3 can be software controlled or human controlled in real time. A condenser lens 4 is located in line after the LCD 2. The pattern 3 on the LCD 2, which can be dark with a clear circle 3a for example, allows light to pass through the LCD 2, as illustrated by 1b with light provided based on the pattern 3 on the LCD. The light in the pattern 3, as illustrated by 1c, travels down through a micro plate well 5, down through the meniscus 6 to the sample located at the specimen plane 7. The light path 1c from the bright phase ring is distorted by the meniscus 6 of the liquid 6a, as illustrated by 1d before illuminating the sample at the specimen plane 7. The sample at the specimen plane 7 is magnified by the objective 8 as shown by 1e. The magnified image 1e then passes through the dark phase ring 9a of a phase plate 9, as shown at if to the final image plane 10. The phase plate 9 typically includes a glass plate having a dark circle or ring thereon, as represented by 9a, and is well known in the art. The arrangement shown in FIG. 1 shows the light traveling down the center of the micro plate well 5 with minimal adjustment of the bright phase ring pattern needed. The LCD 2 is controlled by the liquid crystal controller 2a, providing the pattern needed for phase imaging through the liquid 6a. The image plane 10 can be an eyepiece on the microscope or a memory device 11 such as a camera, as is known in the art, and attached through a personal computer to an image processing program 12. Such image processing programs are generally well known in the art however, these programs can be programmed and/or designed according to the invention to compare portions of the aligned views, as discussed in more detail below with reference to FIGS. 7A and 7B, until the bright phase ring is aligned with the dark ring With continuing reference to FIG. 1, operator can view the sample or a computer processor can be associated with the image processor 12 to determine if the sample can be adequately viewed. Based upon this observation, it can be determined if adjustment to the LCD 2 is necessary. The operator can then manually adjust or rely upon a computer program to adjust the liquid crystal controller 2a to adjust the pattern 3 of the visible phase ring 3a of the LCD 2, as necessary. This adjustment can occur dynamically during the course of observation of the sample to align the visible ring with the black ring. During the course of observation of a sample, which can last several days, the sample volume, and hence the meniscus can change. Also, observation can be conducted over a series of samples within a series of micro plates in a well, such as in an experiment where different compounds are added into different wells containing the sample to determine the effect of the various compounds added to the samples. Prior to the invention, any adjustment had to be conducted manually, and once set, was difficult to change, to compensate for changes in the product sample. The present invention enables the liquid crystal contents to dynamically and/or continuously adjust the shape or location of the visible light LCD 2 during the period of observation or during the life of the experiment to overcome any distortion of the light from the meniscus and bring the light ring into alignment with the dark ring.

Figure 2A:
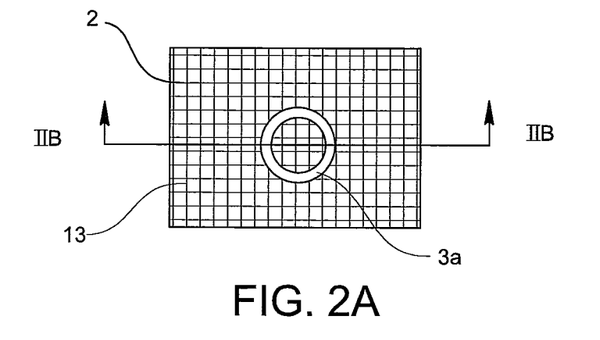
FIG. 2A is a top plan view of the visible light LCD of FIG. 1.
Figure 2B:
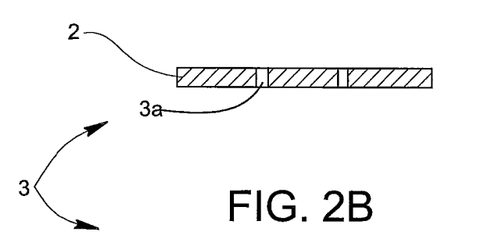
FIG. 2B is a cross-sectional view, taken along line IIB-IIB of the visible light LCD of FIG. 2A.

FIG. 2A is a top plan view and FIG. 2B is a cross-sectional view taken along line of FIG. 2A depicting the visible light LCD 2 of FIG. 1 including the pattern 3. The dark zone 13, which can be a black or dark portion, does not let light pass therethrough, but the clear region 3a transmits light based on the pattern 3 sent from the liquid crystal controller 2a.

Figure 3A:
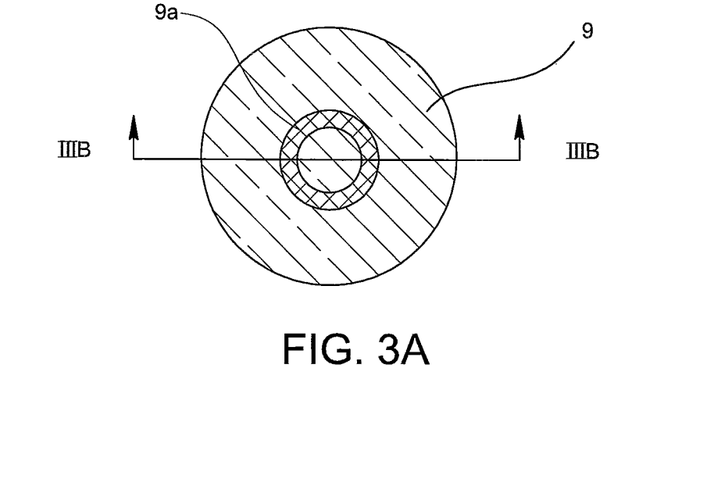
FIG. 3A is a top plan view of the phase plate including the dark phase ring of FIG. 1.
Figure 3B:
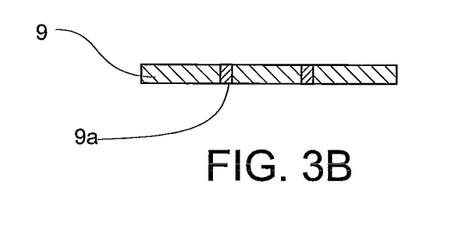
FIG. 3B is a cross-sectional view, taken along line IIIB-IIIB of the phase plate of FIG. 2B.

FIG. 3A is a top plan view and FIG. 3B is a cross-sectional view taken along line IIIB-IIIB depicting the phase plate 9 including the dark phase ring 9a of FIG. 1. This dark phase ring 9a is typically a black painted ring on a clear glass phase plate 9 which can be located at the bottom plane of the microscope objective 8. The ring diameter and thickness is unique to the objective, so typically a visible phase ring is specified. When the researcher changes to a different objective, a different phase ring is required.

Figure 4:
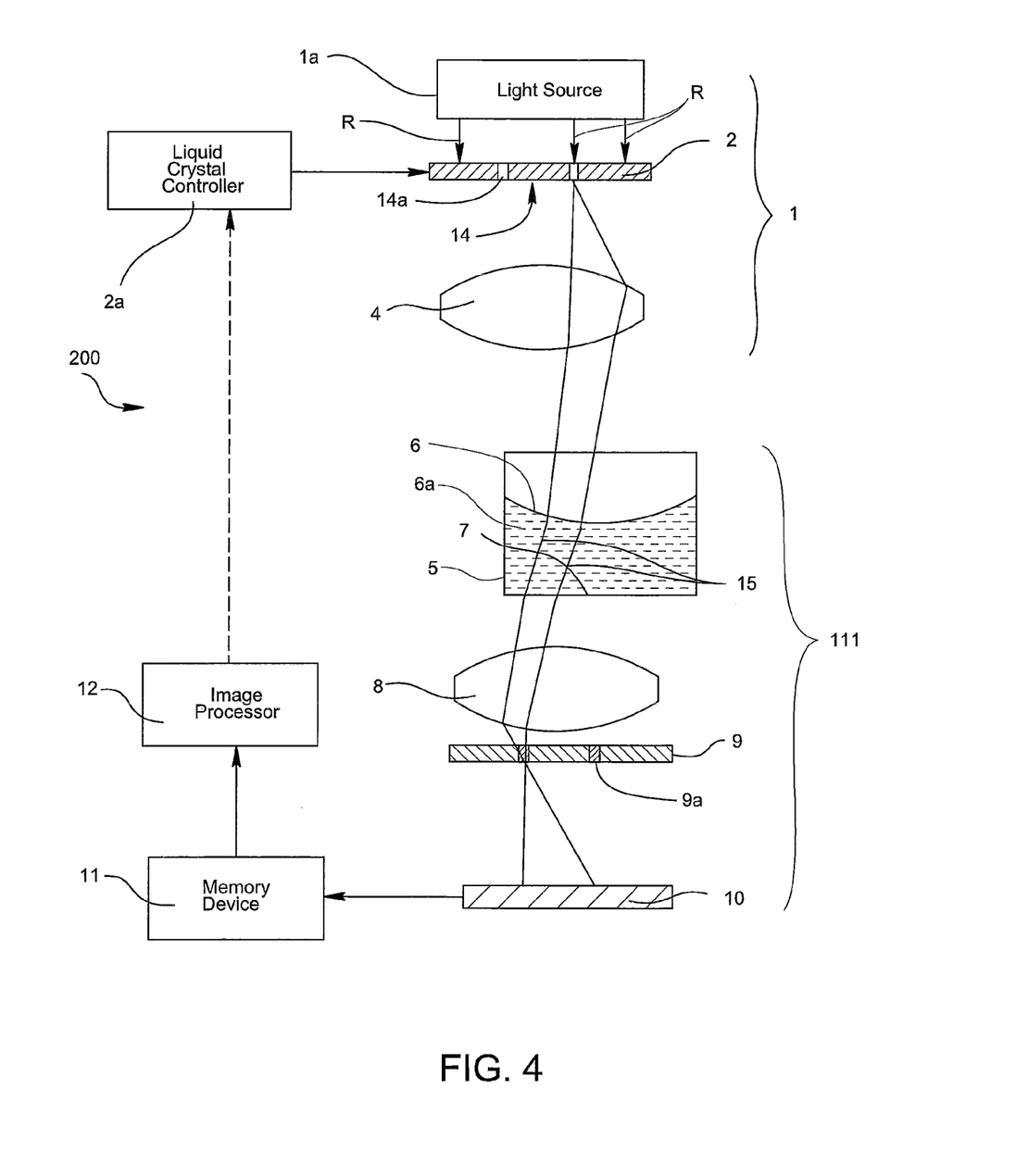
FIG. 4 is a schematic side view showing an embodiment of the phase contrast microscope similar to FIG. 1, wherein the specimen location is off-center from the center of the meniscus.
Figure 5A:
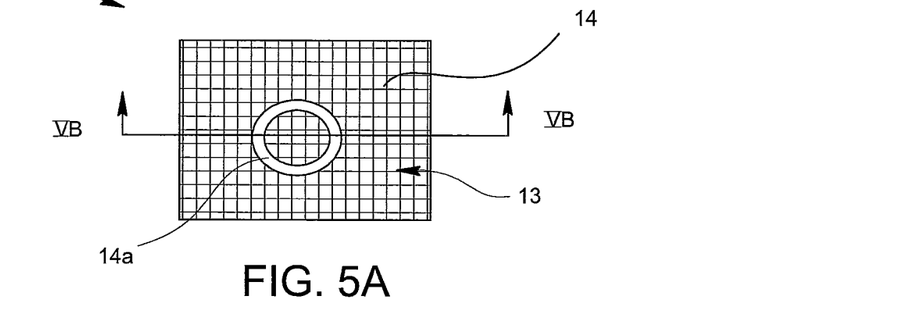
FIG. 5A is a top plan view of the visible light LCD of FIG. 4 showing a first pattern change in the LCD pattern needed to compensate for the off-center specimen location of FIG. 4.
Figure 5B:
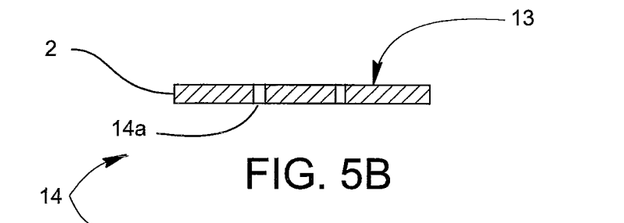
FIG. 5B is a cross-sectional view, taken along line VB-VB of the visible light LCD of FIG. 5A.

Reference is now made to FIG. 4, which shows a schematic side view showing an embodiment of the phase contrast microscope, generally indicated as 200, similar to FIG. 1 but wherein the specimen location is not necessarily in the center of the meniscus 6, i.e., the specimen location is off-center from the center of the meniscus 6. In this arrangement, the LCD 2 cooperates with a computer and/or a liquid crystal controller 2a to produce a pattern, generally indicated as 14, including a visible phase ring 14a, that compensates for the change in refraction of the light, as shown by 15, as the light enters the liquid 6a in the micro plate well 5 before illuminating the sample at the specimen plane 7. As shown in FIG. 1, the sample at the specimen plane 7 is magnified by the objective 8 and the magnified image then passes through the dark phase ring 9a as shown by the final image plane 10. FIGS. 5A and 5B show the change in the LCD 2 pattern 14, sent from the liquid crystal controller 2a, needed to compensate for the off center meniscus 6 of FIG. 4. The pattern 14 includes a clear center ring 14a in a slight oval pattern for transmitting light, and a dark or black zone 13 that does not let light pass there through. This modified pattern 14 of the LCD 2 compensates for the change in refraction of the light 15.

Figure 5C:
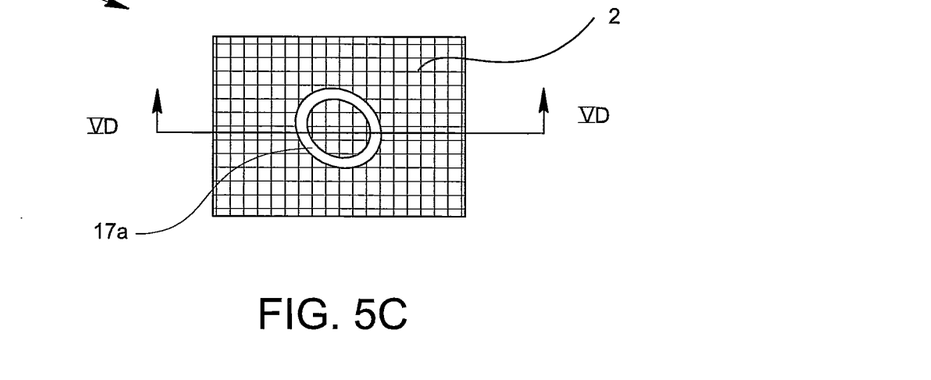
FIG. 5C is a top plan view of the visible light LCD of FIG. 4 showing a second pattern change based upon a different location in the well of the plate of FIG. 4.
Figure 5D:
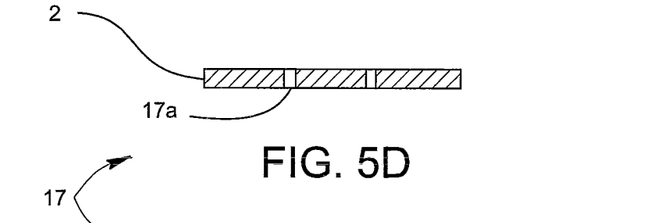
FIG. 5D is a cross-sectional view, taken along line VD-VD of the visible light LCD of FIG. 5C.

FIGS. 5C and 5D shows a second pattern, generally indicated as 17, which can be used that is based on a different location of the refracted light 15 resulting from an off center meniscus 6 as it moves through the sample in the well of the plate 5. This second pattern 17 also includes a clear center ring 17a, which is in a slight oval offset pattern for transmitting light, and a dark zone 13 that does not let light pass.

Figure 6:
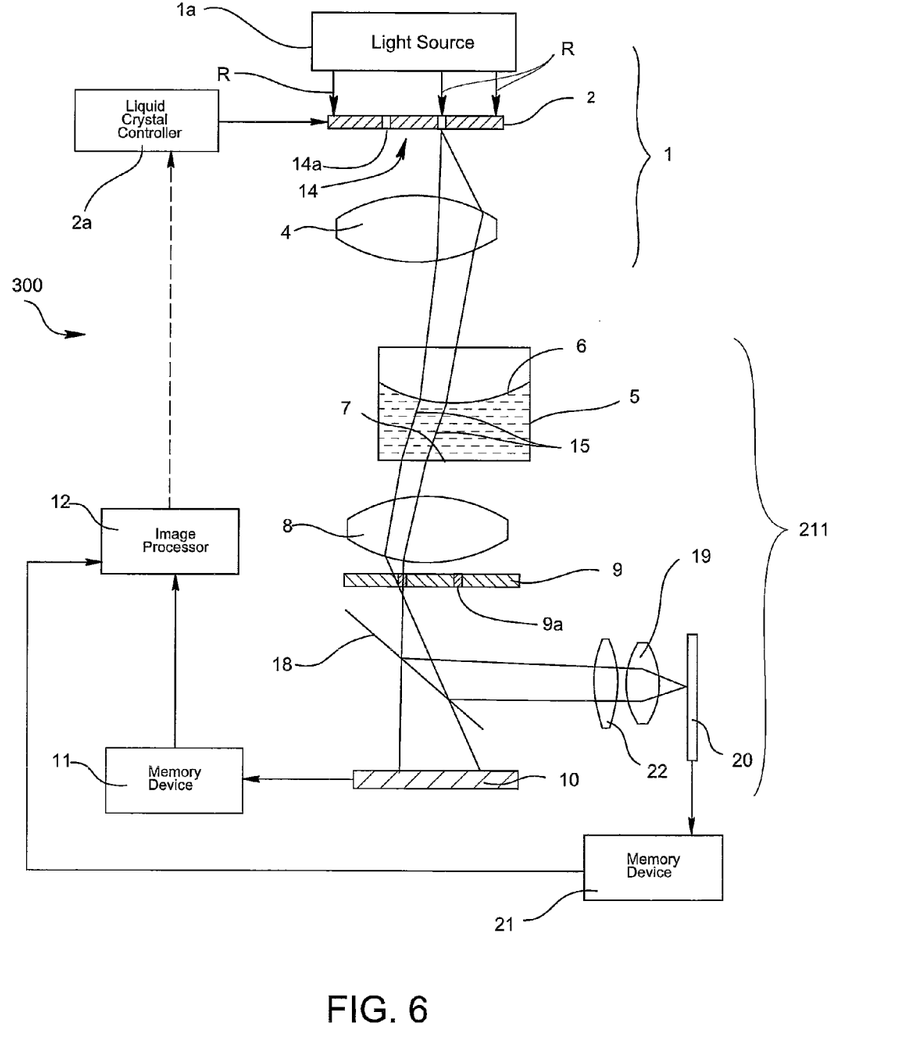
FIG. 6 is a schematic side view showing an embodiment of the phase contrast microscope similar to FIG. 1, according to another embodiment including a beam splitter.

Reference is now made to FIG. 6 which shows a schematic side view showing an embodiment of the phase contrast microscope, generally indicated by 300, similar to FIG. 1, including the illuminating optical system 1 and an imaging optical system 211 wherein the imaging optical system 211 includes the addition of a beam splitter 18 and a Bertrand lens arrangement The beam splitter 18 allows for viewing the image through an eyepiece 19 at a second image plane 20. In this configuration, 80% of the light is traveling to the image plane 10 and 20% to the eyepiece 19. The Bertrand lens arrangement includes a Bertrand lens 22, which assists in viewing of the image so that the visible phase ring can be centered in the dark ring 9a and a memory device 21, such as a camera, as is known in the art, is installed into the second image plane 20. The image captured by the memory device or camera 21 is sent to the image processor 12, to provide feedback for adjusting the visible phase ring pattern 14.

Figure 7A:
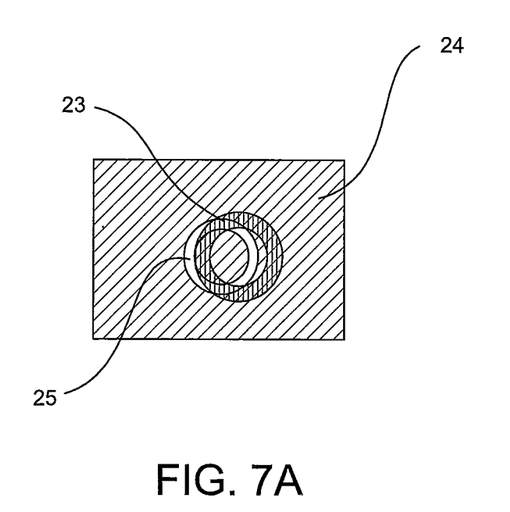
FIG. 7A is a top view showing the pattern collected if the visible phase ring is not aligned with the dark phase ring below the objective.

FIG. 7A shows the pattern or image collected in the FIG. 6 arrangement when one is viewing the image through the Bertrand lens 22 if the visible phase ring 14a is not aligned with the dark phase ring 9*a* below the objective 8. This arrangement, using the Bertrand lens arrangement, positions a dark ring 23 in the view field 24 and the bright circle 25 is the visible phase ring.

Figure 7B:
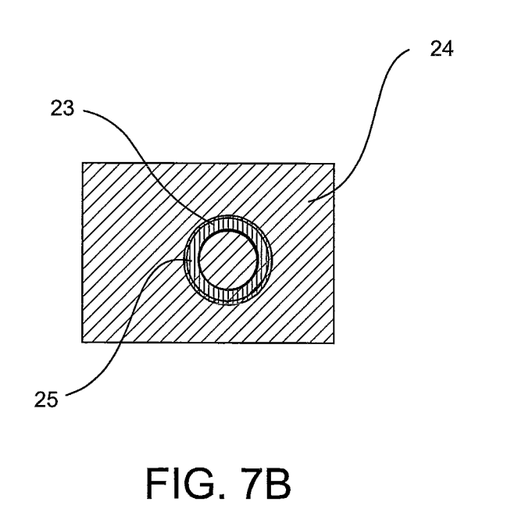
FIG. 7B is a top view similar to FIG. 7A showing the pattern collected if the bright phase ring is aligned with the dark ring from the Bertrand assembly representing the dark phase ring under the objective.

FIG. 7B shows the same system of FIG. 6 with the bright phase ring 25 aligned with the dark ring 9*a* or dark ring 23 from the Bertrand lens arrangement representing the dark phase ring 9*a* under the objective 8. The image formed to align the visible phase ring 14*a* with the dark phase ring 9 of FIG. 6 is not necessarily a round pattern, since it is affected by the meniscus 6 of the fluid in the well 5, as shown by 15 in FIG. 6.

FIGS. 7A and 7B represent the image the operator views when the Bertrand Lens is in place. This is the view through the eyepiece or through the separate camera mounted in place of the eyepiece. The background 24, can be a ½ gray image, while the dark phase ring 23 can be represented by a darker gray image. As discussed above, in the prior art, the bright phase ring 25 is produced by the light passing through the condenser annulus. Prior to the present invention, the operator would manually adjust the condenser annulus to align the dark phase ring with the bright phase ring. When an LCD 2, as in the present invention, is used is in place of the condenser annulus of the prior art, one is able to dynamically and easily move the clear area in the LCD 2 as necessary to achieve this alignment. As such, the use of the LCD 2 of the invention enables the operator to eliminate the need for manually moving the condenser annulus to align the bright phase ring with the dark phase ring.

Software can be designed or written to achieve alignment of the bright phase ring with the dark phase ring. One method would be to produce a pattern of squares on the LCD, one at a time, to see if the clear square, passing the visible light, aligns with the dark phase ring. If so, that square is used to produce the bright pattern. Switching of square patterns on the LCD, one at a time, produces a final pattern. In the case of a well defined meniscus, typically an oval pattern is the end result, although any pattern is possible. The image processing necessary to detect the changes, can be an open source method or it can be obtained from an image processing library such as one produced by National Instruments, that is capable of easily linking with the control software. Examples of image processing can include, but are not limited to Image J and CellProfiler, which can do basic image processing (open source) and Matlab and Matrox which are other types of programs that can be used.

The present invention allows one to adjust the pattern at the beginning of the experiment, for each location, which is an improvement over the manual prior art techniques. Also, the invention enables one to change the pattern dynamically, as the cells change shape, or the meniscus changes. The present invention can be used with our without the use of the Bertrand lens arrangement and the second camera. In the situation where the microscope is being used without the Bertrand lens arrangement, one is able to work from the final image of the cells. In this situation, the pattern would be detected in the final image by an improvement in the edges of the cells. Better phase gives more detail in the cell edges. This can be detected by different image processing methods, but in general, a library function called "Edge Detection", as is known in the art, is one of many possibilities.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this description. For example, it is to be understood that the present invention contemplates that to the extent possible, one or more features of any embodiment can be combined with one or more features of any other embodiment.

The invention claimed is:

1. An adjustable phase contrast microscope comprising an illuminating optical system including an electrical device for constructing an adjustable visible phase ring, the adjustable visible phase ring being dynamically adjustable based on position, fluid height, and/or viscosity of a sample.

2. The microscope of claim 1, wherein the electrical device comprises a light source, a liquid crystal display (LCD), and a liquid crystal controller for constructing the adjustable visible phase ring.

3. The microscope of claim 2, including a member configured for cooperation with the liquid crystal controller for dynamically adjusting the visible phase ring to compensate for any distortion of the image throughout the life of an experiment or during a predetermined period of observation.

4. The microscope of claim 1, wherein the electrical device is capable of being turned on or off to affect the visible or fluorescent light applied to a sample.

5. The microscope of claim 1, wherein the electrical device is capable of changing the wavelength used to illuminate cells within a sample being viewed.

6. The microscope of claim 1, further comprising a Bertrand lens camera, wherein the electrical device is configured to produce a predetermined pattern and an operator is capable of viewing an image from the Bertrand lens camera.

7. The microscope of claim 6, wherein the electrical device comprises a light source, a liquid crystal display (LCD), and a liquid crystal controller for constructing the adjustable visible phase ring.

8. The microscope of claim 7, including a member configured for cooperation with the liquid crystal controller for dynamically adjusting the phase ring to compensate for any distortion of the image throughout the life of an experiment or during a predetermined period of observation.

9. The microscope of claim 6, wherein the electrical device is capable of being turned on or off to affect the visible or fluorescent light applied to a sample.

10. The microscope of claim 6, wherein the electrical device is capable of changing the wavelength used to illuminate cells within a sample.

11. The microscope of claim 1, wherein the electrical device is configured to dynamically and/or continuously adjust a shape or location of the visible phase ring during a period of observation or during the life of an experiment to overcome any distortion of light from the meniscus in the sample and bring the visible phase ring into alignment with a dark ring.

12. An adjustable phase contrast microscope comprising an illuminating optical system including an electrical device for constructing an adjustable visible phase ring, the electrical device comprising a light source, a liquid crystal display (LCD), and a liquid crystal controller for constructing the adjustable visible phase ring, the microscope further comprising a member configured for cooperation with the liquid crystal controller for dynamically adjusting the visible phase ring to compensate for any distortion of the image throughout the life of an experiment or during a predetermined period of observation, wherein the member for dynamically adjusting the phase ring comprises an image processing system that is based on a cycle of sending a pattern to the LCD and through a sample to obtain an image and wherein this image is then sent to a memory device, and finally an image processor.

13. The microscope of claim 12, wherein the image processing system is configured to determine if the light provided adds to the phase, based on brightness or contrast in the image.

14. An adjustable phase contrast microscope comprising an illuminating optical system with an electrical device for constructing an adjustable visible phase ring and a Bertrand lens camera, wherein the electrical device is configured to produce a camera, wherein the electrical device comprises a light source, a liquid crystal display (LCD), and a liquid crystal controller for constructing the adjustable visible phase ring, the microscope further comprising a member configured for cooperation with the liquid crystal controller for dynamically adjusting the phase ring to compensate for any distortion of the image throughout the life of an experiment or during a predetermined period of observation and wherein the member for dynamically adjusting the phase ring comprises an image processing system that is based on a cycle of sending a pattern to the LCD and through a sample to obtain an image, and wherein this image is then sent to a memory device, and finally an image processor.

15. A method for adjusting phase contrast in an inverted microscope for viewing cells within a sample comprising providing an illuminating optical system with an electrical device for constructing an adjustable visible phase ring, the electrical device being configured to dynamically adjust the visible phase ring based on position, fluid height, and/or viscosity of a sample.

16. The method of claim 15, wherein the electrical device comprises a light source, a liquid crystal display (LCD), and a liquid crystal controller for constructing the adjustable visible phase ring.

17. The method of claim 15, including turning on or off the electrical device to affect the visible or fluorescent light applied to the sample.

18. The method of claim 15, wherein the electrical device can be manipulated to change the wavelength used to illuminate the cells in the sample.

19. The method of claim 16, wherein dynamically adjusting the visible phase ring includes dynamically adjusting the pattern of the LCD based upon an image observed from the sample to compensate for any image distortion caused by a meniscus in a fluid containing the sample.

20. The method of claim 15, wherein the electrical device is configured to dynamically and/or continuously adjust a shape or location of the visible phase ring during a period of observation or during the life of an experiment to overcome any distortion of light from the meniscus in the sample and bring the visible phase ring into alignment with a dark ring.

\* \* \* \* \*

UNITED STATES PATENT AND TRADEMARK OFFICE
CERTIFICATE OF CORRECTION

| | | |
|---|---|---|
| PATENT NO. | : 9,069,175 B2 | Page 1 of 1 |
| APPLICATION NO. | : 13/442251 | |
| DATED | : June 30, 2015 | |
| INVENTOR(S) | : Douglas J. Koebler et al. | |

It is certified that error appears in the above-identified patent and that said Letters Patent is hereby corrected as shown below:

In the claims

Column 9, Line 9, Claim 14, delete "produce a" and insert -- produce a predetermined pattern and an operator is capable of viewing an image from the Bertrand lens --

Column 9, Line 16, Claim 14, delete "and" and insert -- and, --

Signed and Sealed this
Twenty-sixth Day of January, 2016

Michelle K. Lee
*Director of the United States Patent and Trademark Office*